Figure 1:
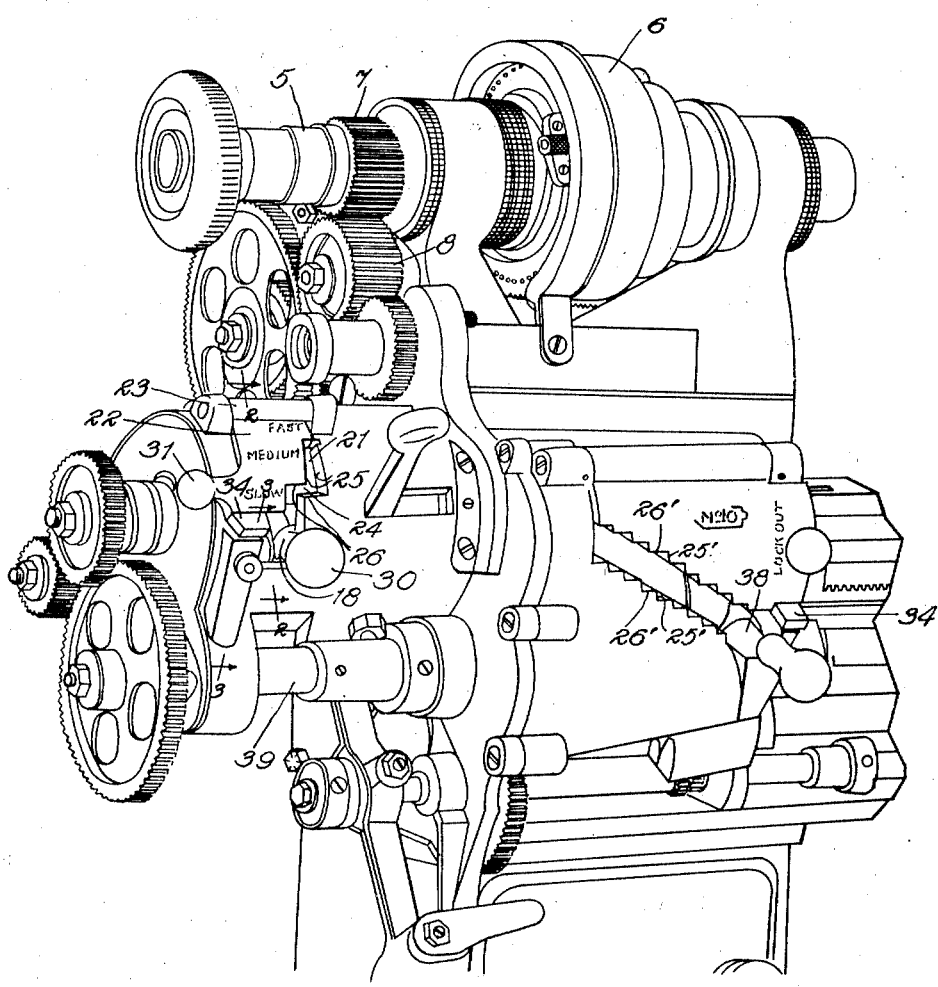

F. HARDINGE.
GEAR MECHANISM.
APPLICATION FILED APR. 20, 1918.

1,334,242.

Patented Mar. 16, 1920.
2 SHEETS—SHEET 1.

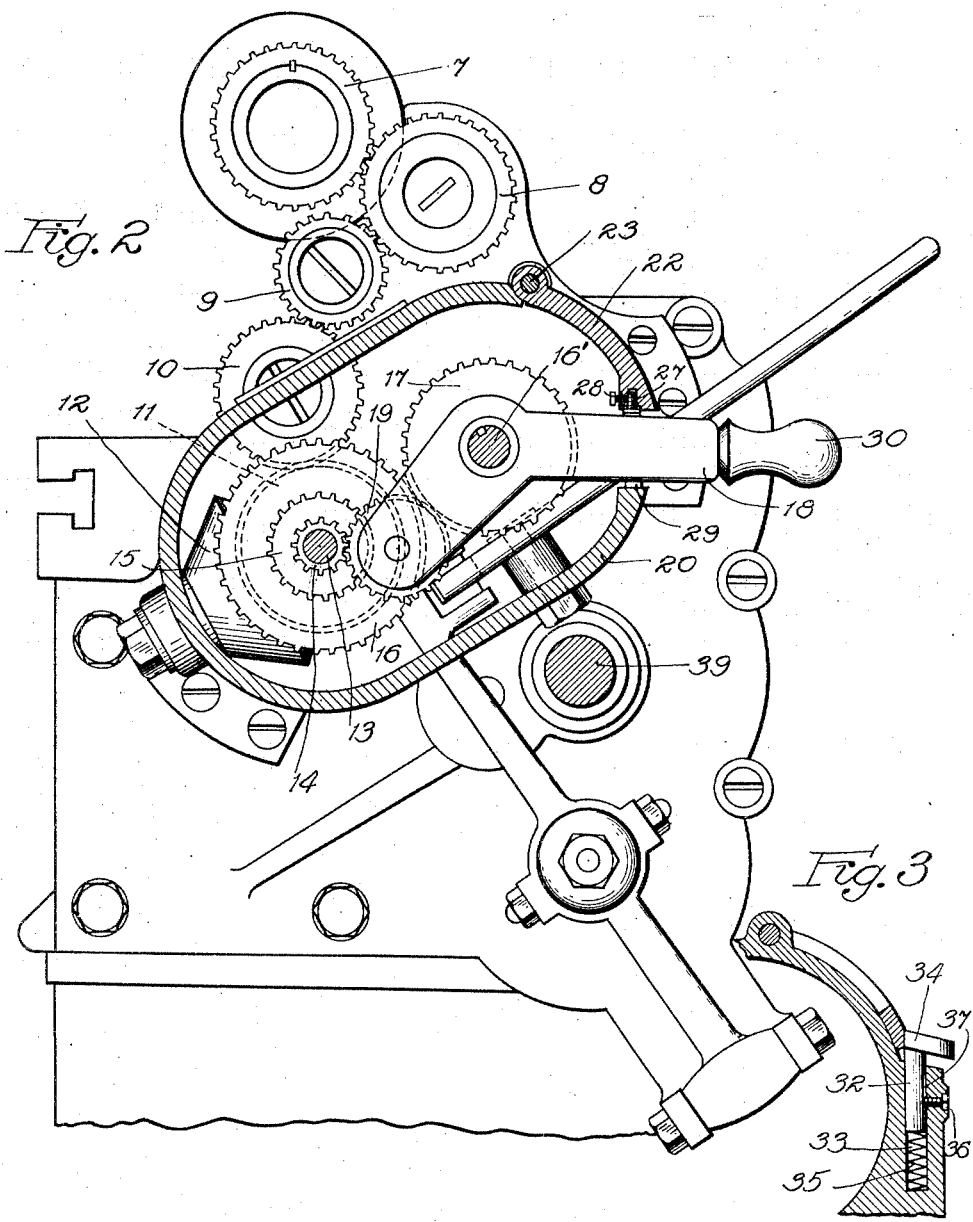

UNITED STATES PATENT OFFICE.

FRANKLIN HARDINGE, OF CHICAGO, ILLINOIS, ASSIGNOR TO HARDINGE BROTHERS, OF CHICAGO, ILLINOIS, A CORPORATION OF ILLINOIS.

GEAR MECHANISM.

1,334,242.  Specification of Letters Patent.  Patented Mar. 16, 1920.

Original application filed January 28, 1915, Serial No. 4,841. Divided and this application filed April 20, 1918. Serial No. 229,693.

*To all whom it may concern:*

Be it known that I, FRANKLIN HARDINGE, a citizen of the United States, residing at Chicago, in the county of Cook and State of Illinois, have invented a certain new and useful Improvement in Gear Mechanism, of which the following is a full, clear, concise, and exact description, reference being had to the accompanying drawings, forming a part of this specification.

This invention relates to improvements in gear mechanism and is especially concerned with means for connecting a driving and a driven shaft in various driving relations, and means for locking the driving connections in various adjusted positions.

My invention is more particularly concerned with the provision of means for connecting a driving shaft with a driven shaft in such a manner that the driven shaft may be driven at various speeds, and means for locking the driving connections in position to give any desired speed.

In its preferred embodiment my invention comprises a driving shaft having a plurality of stepped gears secured thereto, a driven shaft having a gear splined thereon, a lever pivotally and slidingly mounted upon the driven shaft and carrying a pinion which meshes with the gear on said driven shaft, and which can be brought into driving relations with any one of the stepped driving gears, the gearing being inclosed in a casing provided with a pivoted cover, the free edge of which is spaced from the adjacent edge of the casing to provide a slot through which one end of the lever projects, the adjacent edges of the cover and casing being provided with a plurality of abutments for locking the handle in any one of its adjusted positions from movement either axially or about the driven shaft.

While my invention is capable of other adaptations and modifications, I have illustrated it in connection with an engine lathe in the accompanying drawing in which, Figure 1 is a perspective view of the headstock end of a lathe, and Fig. 2 is a section through the change speed gearing taken approximately on line 2—2 of Fig. 1.

Fig. 3 is a sectional detail view taken approximately on the line 3—3 of Fig. 1 showing the details of the cover lock mechanism.

Similar reference characters refer to similar parts in the several figures.

Referring to the drawings the reference character 5 indicates the headstock spindle of the lathe provided with the usual cone pulley 6, and a gear 7, which drives a train of gears comprising the gears 8, 9, 10 and 11 respectively. The gear 11 coacts with one of three beveled gears, one of which is shown at 12, to drive the shaft 13 in either direction. The shaft 13 will, for the sake of convenience, be termed the driving shaft. The mechanism thus far described is old and forms no part of my present invention, and will therefore not be described more in detail.

Keyed or otherwise secured to the shaft 13 are a plurality of stepped gears 14, 15 and 16 respectively. The driven shaft 16' has splined thereon a gear 17 which rotates between the bifurcated end of the bell-cranked lever 18, which is slidably mounted on the shaft 16'. A pinion 19 is rotatably mounted on the inner arm of the lever 18 and meshes with the gear 17. By sliding the lever 18 along the shaft 16' the gear 19 can be brought into driving relations with any one of the stepped gears 14, 15 and 16, and by this means the shaft 16' can be driven at different speeds.

A casing 20 surrounds the gearing just described and is provided with an opening 21 closed by a cover 22, which is pivoted thereto at 23. The free edge of the cover is spaced from the adjacent edge of the casing to provide an inclined slot 24 which permits the lever 18, which projects through this slot, to be adjusted both axially and circumferentially of the shaft 16' in order to bring the pinion 19 into driving relation with any one of the stepped gears. The opposed edges of the cover and the casing are stepped to provide a plurality of coacting abutments 25 and 26, which when the cover is in its closed position prevent either axial or circumferential displacement of the lever relative to the shaft 16.' The horizontal portions of the free edge of the cover 22 are provided with set screws 27, which are held in any adjusted position by means of the set screws 28 to adjust the position of the lever 18. Set screws 29 similar to the set screws 28 are provided in the horizontal portions of the stepped edge of the casing to provide upward adjustment of the lever 18, and are also provided with means not shown for locking them in their adjusted positions. The lever 18 is provided with a handle 30, by means of which it can be moved to any of its various positions.

The cover 22 is likewise provided with a handle 31 by means of which it can be opened to permit the proper adjustment of the lever 18, and closed to hold it in its adjusted position. While the weight of the cover 22 would ordinarily be sufficient to prevent any accidental shifting of the lever 18, I prefer to provide means for locking the cover in its closed position, this means being illustrated in Fig. 3 and comprising a plunger 32 slidably mounted in a bore 33 in the casing and provided with an outwardly and downwardly inclined thumb piece 34, the inner edge of which acts as an abutment for holding the cover in its closed position. The plunger 32 is held in its uppermost position by the spring 35, which is seated on the bottom of the bore 33, and is held against rotation by means of a set screw 36, which engages in a longitudinal slot 37 in the side of the plunger. By pressing downward upon the thumb piece 34 the cover is released and may be opened by means of the handle 31. Upon closing of the cover the lower edge thereof acts upon the inclined upper edge of the thumb piece 34 to push it downwardly until the cover occupies its closed position, when the thumb piece is forced upwardly by the spring 35 and thereby locks the cover in place. At 38 I have illustrated another gear shift lever which is held in its adjusted positions by means of vertical abutments 25' and the horizontal abutments 26', the lever 38 being used to shift variable speed driving connections between the shaft 16', and the lead screw shaft 39. As the connections are similar to the connections between the shafts 13 and 16' they are not illustrated.

This application is a division of my application, Serial No. 4841 filed January 28, 1915.

While I have described the details of the preferred embodiment of my invention, it is to be understood that it is capable of other modifications. It will, of course, be clear that the stepped gears might be secured to the driven shaft and the gear 17, lever 18 and pinion 19 mounted upon the driving shaft, this being a mere reversal of parts, and the claims appended hereto are intended to cover such a reversal of parts as well as other modifications within the scope of these claims.

Having thus described my invention, what I claim is:

1. A machine comprising a driven shaft having a gear splined thereon, a driving shaft having stepped gears secured thereon, a lever pivoted on said driven shaft, a pinion rotatably mounted on said lever and meshing with said gear, a casing for said gearing provided with a pivotally mounted cover having its free edge spaced from the adjacent edge of the casing and inclined relatively to the axis of said driven shaft to form an inclined slot through which said lever extends, the opposed edges of said slot being stepped to provide abutments for preventing both horizontal and vertical movement of said lever, and means secured to one of said opposed edges to adjust the position of said lever.

2. A machine comprising a driven shaft having a gear splined thereon, a driving shaft having stepped gears secured thereon, a lever pivoted on said driven shaft, a pinion rotatably mounted on said lever and meshing with said gear, and a casing for said gearing provided with a pivotally mounted cover having its free edge spaced from the adjacent edge of the casing and inclined relatively to the axis of said driven shaft to form an inclined slot through which said lever extends, the opposed edges of said slot being stepped to provide abutments for preventing both horizontal and vertical movement of said lever.

3. A machine comprising a driven shaft having a gear splined thereon, a driving shaft having stepped gears secured thereon, a lever pivoted on said driven shaft, a pinion rotatably mounted on said lever and meshing with said gear, and a casing for said gearing provided with a pivotally mounted cover having its free edge spaced from the adjacent edge of the casing and inclined relatively to the axis of said driven shaft to form an inclined slot through which said lever extends, the opposed edges of said cover being provided with means for adjustably locking said lever in a plurality of positions in said slot.

4. A machine comprising a driven shaft having a gear splined thereon, a driving shaft having stepped gears secured thereon, a lever pivoted on said driven shaft, a pinion rotatably mounted on said lever and meshing with said gear, and a casing for said gearing having an inclined edge for supporting one end of said lever and permitting its adjustment axially and circumferentially by said driving shaft, and a cover pivotally mounted to said casing for locking said lever in any of its adjusted positions.

5. In a machine the combination of a driving and a driven shaft, means for connecting said shafts in a plurality of different driving relations comprising a shiftable lever, a casing for said driving connections, and an element pivoted on said casing for locking said lever in any one of its adjusted positions.

In witness whereof I hereunto subscribe my name this 17th day of April, 1918.

FRANKLIN HARDINGE.

Witnesses:
MARY A. COOK,
ANDREW WINTERCORN.